(12) United States Patent
Katayama

(10) Patent No.: US 9,991,826 B2
(45) Date of Patent: Jun. 5, 2018

(54) MOTOR CONTROL CIRCUIT, MOTOR DRIVE CONTROL APPARATUS AND CONTROL METHOD OF MOTOR DRIVE CONTROL APPARATUS

(71) Applicant: Minebea Mitsumi Inc., Nagano (JP)

(72) Inventor: Keiichi Katayama, Yonago (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days. days.

(21) Appl. No.: 15/634,299

(22) Filed: Jun. 27, 2017

(65) Prior Publication Data

US 2018/0026558 A1  Jan. 25, 2018

(30) Foreign Application Priority Data

Jul. 19, 2016 (JP) .................................. 2016-141837

(51) Int. Cl.
| | |
|---|---|
| H02P 1/04 | (2006.01) |
| H02P 6/08 | (2016.01) |
| H02P 6/17 | (2016.01) |
| H02P 6/24 | (2006.01) |

(52) U.S. Cl.
CPC .................. *H02P 6/08* (2013.01); *H02P 6/17* (2016.02); *H02P 6/24* (2013.01)

(58) Field of Classification Search
CPC ..... H02P 6/08; H02P 6/17; H02P 6/24; H02H 7/08
See application file for complete search history.

(56) References Cited

U.S. PATENT DOCUMENTS

2002/0093774 A1* 7/2002 Chung .................. H01H 9/542
361/2

FOREIGN PATENT DOCUMENTS

JP    2013-165627 A    8/2013

* cited by examiner

*Primary Examiner* — Karen Masih
(74) *Attorney, Agent, or Firm* — Pearne & Gordon LLP

(57) ABSTRACT

A motor control circuit comprising a speed control circuit configured to output speed command information relating to the rotational speed of a motor based on target information relating to a target rotational speed and rotational speed detection information of the rotational speed of the motor, a drive stop control circuit configured to output a first drive stop control signal for performing braking control of the motor or a second drive stop control signal for performing free-run stop control of the motor based on the rotational speed detection information and the speed command information when input of the target information is stopped, and a drive signal generation circuit configured to generate a drive control signal for driving the motor based on the first drive stop control signal or the second drive stop control signal when the first drive stop control signal or the second drive stop control signal is output.

7 Claims, 7 Drawing Sheets

| | CONTROL OPERATION | Sc | Sr | S1 | Sb | Ss | S2 | S5a | S5b | Sd |
|---|---|---|---|---|---|---|---|---|---|---|
| CONVENTIONAL ART | NORMAL DRIVE | YES | — | YES | 0 | 0 | — | NO | NO | DRIVE |
| | BRAKING | YES | — | YES | 1 | 0 | — | YES | NO | BRAKING |
| | FREE-RUN STOP | YES | — | YES | 0 | 1 | — | NO | YES | FREE-RUN STOP |
| PRESENT EMBODIMENT | (1) DECELERATION CONTROL (START) | NO | — | YES | 0 | 0 | — | NO | NO | DRIVE |
| | (2) DECELERATION CONTROL (EXECUTION) → BRAKING (START) | NO | EQUAL TO OR LESS THAN THRESHOLD | EQUAL TO OR LESS THAN THRESHOLD | 0 | 0 | EQUAL TO OR LESS THAN THRESHOLD | YES | NO | BRAKING |
| | (3) BRAKING → FREE-RUN STOP (START) | NO | SUBSTANTIALLY ZERO | NO | 0 | 0 | SUBSTANTIALLY ZERO | NO | YES | FREE-RUN STOP |
| | (4) FREE-RUN STOP → BRAKING (START) | — | EQUAL TO OR GREATER THAN THRESHOLD | NO | 0 | — | EQUAL TO OR GREATER THAN THRESHOLD | YES | NO | BRAKING |
| | (5) BRAKING (EXECUTION) → FREE-RUN STOP (START) | — | SUBSTANTIALLY ZERO | NO | 0 | — | SUBSTANTIALLY ZERO | NO | YES | FREE-RUN STOP |

FIG.3

MOTOR CONTROL CIRCUIT, MOTOR DRIVE CONTROL APPARATUS AND CONTROL METHOD OF MOTOR DRIVE CONTROL APPARATUS

This application claims the benefit of Japanese Patent Application No. 2016-141837, filed Jul. 19, 2016, which is hereby incorporated by reference in its entirety.

BACKGROUND

Technical Field

The present disclosure relates to a motor control circuit, a motor drive control apparatus and a control method of the motor drive control apparatus, and, particularly, to a motor control circuit, a motor drive control apparatus and a control method of the motor drive control apparatus for controlling driving of a motor based on command information of a target rotational speed and rotational speed detection information of the motor.

Background

As a control scheme of rotational speed of a motor (such as, for example, a fan motor and a brushless DC motor used as a motor for an electric fan) by a motor drive control apparatus, there is a scheme in which a command signal is input from outside, and control is performed so that the rotational speed of the motor becomes a speed according to the command signal (see, for example, Japanese Patent Laid-Open Application Publication No. 2013-165627). Examples of the command signal include, for example, a clock signal. In the case where a clock signal is used as the command signal, the rotational speed of the motor is controlled by comparing the clock signal with a rotational speed signal of the motor and controlling a speed command value of the motor so that the clock signal becomes the same as the rotational speed signal.

In such a motor drive control apparatus, if the clock signal is stopped, the motor is typically stopped using a free-run stop method for turning off driving of all phases in accordance with stoppage of the clock signal.

SUMMARY

However, the apparatus as disclosed in the above-described Japanese Patent Laid-Open Application Publication No. 2013-165627 has the following problems.

When a motor is stopped by a free-run stop method (when a rotor of the motor is in a rotation stop state), the motor functions as a power generator if the rotor is rotated. That is, if the rotor rotates, an inductive voltage is generated, and a power supply voltage of the motor drive control apparatus rises.

Typically, a power supply voltage is used in common in each circuit and circuit part in the motor drive control apparatus. Therefore, if the motor rotates due to unintended external factors in a state where the motor functions as a power generator in this manner, and the power supply voltage of the motor drive control apparatus rises, there is a case where an abnormal state may occur in the motor drive control apparatus by circuit parts (such as, for example, an integrated circuit (IC) and a microcomputer), or the like, being affected by breakage, abnormal operation, or the like.

Specifically, for example, in the case where a motor is used as an outdoor machine of an air conditioner, there is a case where a rotor rotates by an impeller of the outdoor machine provided outside being blown by strong wind, and a power supply voltage rises. In the case where a circuit part which starts operation when the power supply voltage is equal to or higher than a predetermined voltage is used in the motor drive control apparatus, even if a motor drive control circuit is powered off, there is a case where a circuit part operates by the power supply voltage rising in accordance with rotation of the rotor, and erroneous operation occurs. Further, in the case where a withstand voltage of the circuit part is exceeded by rising of the power supply voltage, there is a possibility that the circuit part may be broken.

Further, if the rotor is rotating when an attempt is made to stop the motor using the free-run stop method (when the rotor is rotating while all phases of a drive voltage of the motor are turned off), the state becomes a regenerating state. In the regenerating state, because a regular current path is cut off by all phases of the drive voltage being turned off, a current generated at a coil of the motor flows to the motor drive control apparatus side by way of a body diode provided at a power MOSFET (switching element of an inverter circuit) to turn on/off a drive voltage of each phase of the motor. When a current flows by regeneration in this manner, the power supply voltage of the motor drive control apparatus rises. A rise in the power supply voltage of the motor drive control apparatus affects the circuit part in a similar manner as described above and may cause an abnormal state.

The present disclosure is related to providing a motor control circuit, a motor drive control apparatus and a control method of the motor drive control apparatus which can prevent occurrence of an abnormal state when a free-run stop method is used.

In accordance with one aspect of the present disclosure, a motor control circuit includes a speed control circuit configured to output speed command information relating to the rotational speed of a motor based on target information relating to a target rotational speed and rotational speed detection information of the rotational speed of the motor, a drive signal generation circuit configured to generate a drive control signal for driving the motor based on the speed command information, and a drive stop control circuit configured to output a first drive stop control signal for performing braking control of the motor or a second drive stop control signal for performing free-run stop control of the motor based on the rotational speed detection information and the speed command information when input of the target information is stopped, the drive stop control circuit outputs the first drive stop control signal based on a detection result that the speed command information is equal to or less than a predetermined value and the rotational speed of the motor is equal to or less than a predetermined first threshold and outputs the second drive stop control signal based on a detection result that the speed command information is equal to or less than the predetermined value and the motor is put into a drive stop state, and the drive signal generation circuit generates the drive control signal based on the first drive stop control signal or the second drive stop control signal when the first drive stop control signal or the second drive stop control signal is output at the drive stop control circuit.

Preferably, when input of the target information is stopped in a state where the motor is driven, the speed command information is output by the speed control circuit to perform the control for decelerating the motor, and, when the speed command information becomes equal to or less than the predetermined value and the rotational speed of the motor becomes equal to or less than the first threshold after control for decelerating the motor is started, the first drive stop control signal is output by the drive stop control circuit to perform braking control of the motor, and when the speed command information is equal to or less than the predetermined value and the motor is put into a drive stop state after the braking control of the motor is started, the second drive stop control signal is output by the drive stop control circuit to perform free-run stop control of the motor.

Preferably, in the case where free-run stop control of the motor is performed, the drive stop control circuit outputs the first drive stop control signal based on a detection result that the speed command information is equal to or less than the predetermined value and the rotational speed of the motor is equal to or greater than a predetermined second threshold.

Preferably, in the case where the rotational speed of the motor becomes equal to or greater than the second threshold when free-run stop control of the motor is performed, and then, braking control of the motor is started by the first drive stop control signal being output from the drive stop control circuit, when the speed command information is equal to or less than the predetermined value and the motor is put into a drive stop state, the second drive stop control signal is output by the drive stop control circuit to perform free-run stop control of the motor.

Preferably, the drive stop control circuit is further configured to output the first drive stop control signal when braking command information for performing braking control of the motor is input and output the second drive stop control signal when drive command information for performing free-run stop control of the motor is input, and the drive stop control circuit outputs the first drive stop control signal or the second drive stop control signal based on the rotational speed detection information and the speed command information when input of the target information is stopped and neither the braking command information nor the drive command information is input.

In accordance with another aspect of the present disclosure, a motor drive control apparatus includes the above-described motor control circuit and a motor driving unit configured to drive a motor by outputting a drive signal to the motor based on a drive control signal output from the motor control circuit.

In accordance with yet another aspect of the present disclosure, a control method of a motor drive control apparatus including a motor control circuit configured to output a drive control signal for performing drive control of a motor based on target information relating to a target rotational speed and rotational speed detection information of the rotational speed of the motor, and a motor driving unit configured to drive the motor by outputting a drive signal to the motor based on the drive control signal output from the motor control circuit, the control method including a speed control step of outputting speed command information relating to the rotational speed of the motor based on the target information and the rotational speed detection information, a drive signal generation step of generating the drive control signal for driving the motor based on the speed command information, and a drive stop control step of outputting a first drive stop control signal for performing braking control of the motor or a second drive stop control signal for performing free-run stop control of the motor based on the rotational speed detection information and the speed command information when input of the target information is stopped, in the drive stop control step, the first drive stop control signal is output based on a detection result that the speed command information is equal to or less than a predetermined value and the rotational speed of the motor is equal to or less than a predetermined first threshold, and a second drive stop control signal is output based on a detection result that speed command information is equal to or less than the predetermined value and the motor is put into a drive stop state, and in the drive signal generation step, when the first drive stop control signal or the second drive stop control signal is output in the drive stop control step, the drive control signal is generated based on the first drive stop control signal or the second drive stop control signal.

In accordance with these disclosures, it is possible to provide a motor control circuit, a motor drive control apparatus and a control method of the motor drive control apparatus which can prevent occurrence of an abnormal state when a free-run stop method is used.

BRIEF DESCRIPTION OF THE DRAWINGS

FIG. 3 is a diagram explaining the relationship between an aspect of control operation of a motor and each signal in the present embodiment.

DETAILED DESCRIPTION

A motor drive control apparatus in embodiments of the present disclosure will be described below.

Embodiments

Figure 1:
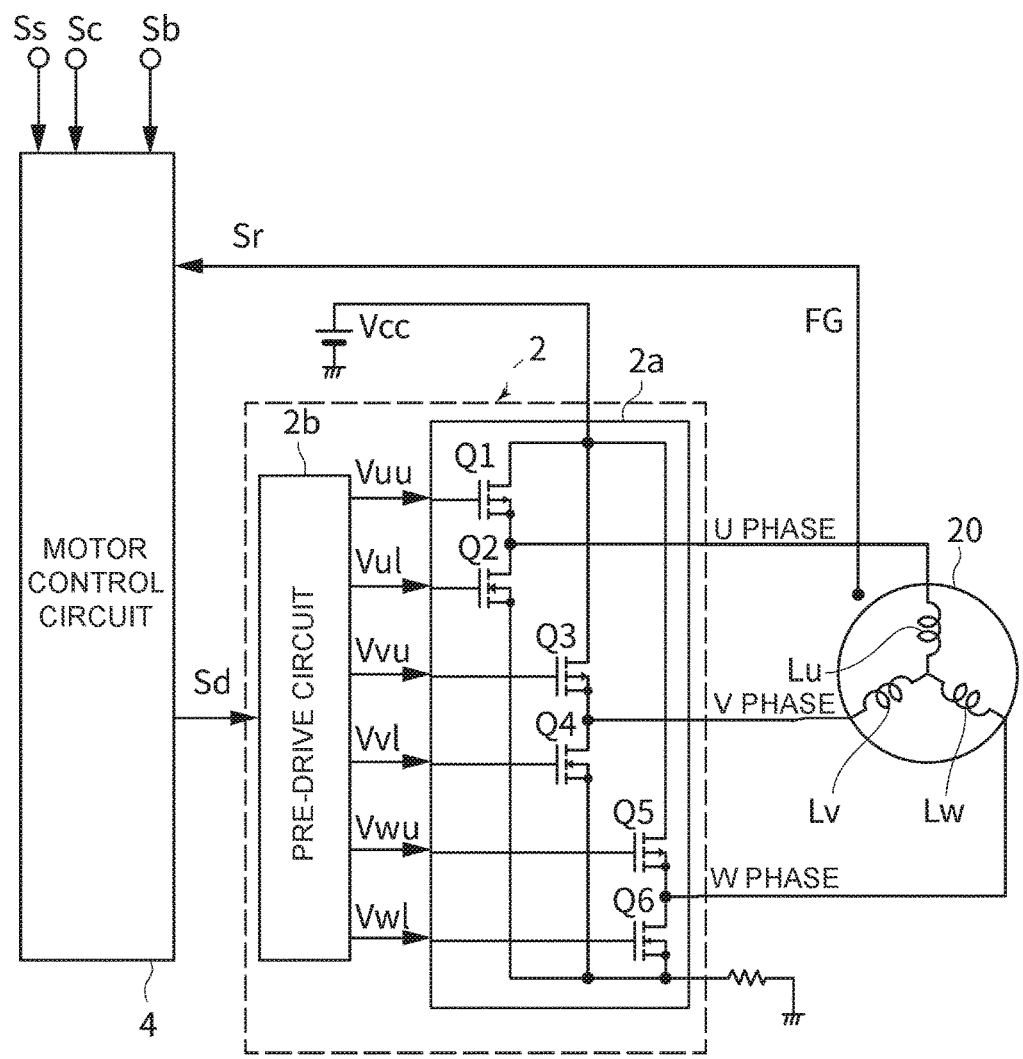
FIG. 1 is a block diagram illustrating circuit configuration of a motor drive control apparatus in one of the embodiments of the present disclosure.

FIG. 1 is a block diagram illustrating circuit configuration of a motor drive control apparatus in one of the embodiments of the present disclosure.

As illustrated in FIG. 1, a motor drive control apparatus 1 is configured to drive a motor 20 through, for example, a sine wave drive. In the present embodiment, the motor 20 is, for example, a three-phase brushless motor. The motor drive control apparatus 1 rotates the motor 20 by causing a sinusoidal dive current to flow through armature coils Lu, Lv and Lw based on a rotational position signal of a rotor. In the present embodiment, the rotational position signal of the rotor is a signal indicating a rotational position of the rotor estimated from an output signal of a Hall (HALL) element (not illustrated).

The motor drive control apparatus 1 includes a motor driving unit 2 including an inverter circuit 2a and a pre-drive circuit 2b and a motor control circuit 4. Note that components of the motor drive control apparatus 1 illustrated in FIG. 1 are part of the whole, and the motor drive control apparatus 1 may include other components in addition to those illustrated in FIG. 1.

In the present embodiment, the motor drive control apparatus 1 is an integrated circuit device (IC) in which the entire apparatus has been packaged. Note that part of the motor drive control apparatus 1 may be packaged as one integrated circuit device or the whole or part of the motor drive control apparatus 1 may be packaged with other apparatuses to constitute one integrated circuit device (IC).

The inverter circuit 2a constitutes a motor driving unit 2 with the pre-drive circuit 2b. The inverter circuit 2a outputs a drive signal to the motor 20 based on an output signal output from the pre-drive circuit 2b to energize the armature coils Lu, Lv and Lw of the motor 20. The inverter circuit 2a is configured, for example, such that pairs of series circuits of two switch elements at an upper side and a lower side provided at both ends of a direct current power supply Vcc (a pair of switch elements Q1 and Q2, a pair of switch elements Q3 and Q4 and a pair of switch elements Q5 and Q6) are respectively disposed for each phase (a U phase, a V phase and a W phase) of the armature coils Lu, Lv and Lw. In each pair of the two switch elements, a terminal of each phase of the motor 20 is connected to a connection point between the switch elements. Specifically, a terminal of the U phase is connected to a connection point between the switch elements Q1 and Q2. A terminal of the V phase is connected to a connection point between the switch elements Q3 and Q4. A terminal of the W phase is connected to a connection point between the switch elements Q5 and Q6.

The pre-drive circuit 2b generates an output signal for driving the inverter circuit 2a based on control by the motor control circuit 4 and outputs the output signal to the inverter circuit 2a. As the output signal, for example, six types of Vuu, Vul, Vvu, Vvl, Vwu and Vwl respectively corresponding to the switch elements Q1 to Q6 of the inverter circuit 2a are output. That is, the output signal Vuu is output to the switch element Q1. The output signal Vul is output to the switch element Q2. The output signal Vvu is output to the switch element Q3. The output signal Vvl is output to the switch element Q4. The output signal Vwu is output to the switch element Q5. The output signal Vwl is output to the switch element Q6. By these output signals being output, the switch elements Q1 to Q6 corresponding to respective output signals perform ON/OFF operation, thereby a drive signal is output to the motor 20, and power is supplied to each phase of the motor 20. In the case where driving of all phases is turned off, all the switch elements Q1 to Q6 are turned off (free-run state).

In the present embodiment, a rotational speed signal (one example of the rotational speed detection information) Sr, a clock signal (one example of the target information) Sc, a brake signal (one example of the braking command information) Sb, and a start signal (one example of the drive command information) Ss are input to the motor control circuit 4.

The rotational speed signal Sr is input to the motor control circuit 4 from the motor 20. The rotational speed signal Sr is, for example, an FG signal corresponding to rotation of the rotor of the motor 20. That is, the rotational speed signal Sr is rotational speed information indicating a detection result of the rotational speed of the motor 20. The FG signal may be a signal (pattern FG) generated using a coil pattern provided on a substrate at the rotor side or may be a signal (Hall FG) generated using output of the Hall (HALL) element disposed at the motor 20. Note that it is also possible to provide a rotational position detection circuit which detects a back electromotive force inducing each phase (U, V and W phases) of the motor 20 to detect the rotational position and the rotational speed of the rotor of the motor 20 based on the detected back electromotive force or use a sensor signal of an encoder, or the like, which detects the rotational speed and the rotational position of the motor.

The clock signal Sc is, for example, input from outside the motor control circuit 4. The clock signal Sc is a signal relating to the rotational speed of the motor 20, and, for example, a signal of a frequency corresponding to target rotational speed of the motor 20. In other words, the clock signal Sc is command information for designating the target rotational speed of the motor 20. Note that the target information relating to the target rotational speed is not limited to the clock signal and may be a PWM (pulse width modulation) signal.

The brake signal Sb is, for example, input from outside the motor control circuit 4. The brake signal Sb is a braking command signal for setting whether braking control of the motor 20 is performed (a short brake command which turns on the lower side switch elements Q2, Q4 and Q6 of each phase is issued) or braking control is not performed. In other words, the brake signal Sb is a signal for performing braking control of the motor 20. In the present embodiment, braking is not performed when the brake signal Sb is "0", and braking is performed when the brake signal Sb is "1".

The start signal Ss is, for example, input from outside the motor control circuit 4. The start signal Ss is a drive command signal for setting whether drive control of the motor 20 is performed or control for putting the state in a standby state where drive control is not performed is performed. When the motor 20 rotates, by performing control so that drive control is not performed and braking control is not performed, it is possible to perform free-run stop control which turns off the switch elements Q1 to Q6 of all phases. In other words, the start signal Ss is a signal for performing free-run stop control. In the present embodiment, free-run stop control is not performed when the start signal Ss is "0", and free-run stop control is performed when the start signal Ss is "1".

The motor control circuit 4 is, for example, configured with a microcomputer, a digital circuit, or the like. The motor control circuit 4 outputs a drive control signal Sd to the pre-drive circuit 2b based on the rotational speed signal Sr, the clock signal Sc, the brake signal Sb, the start signal Ss and the rotational position signal. The motor control circuit 4 performs rotation control of the motor 20 so that the motor 20 rotates at the rotational speed corresponding to the clock signal Sc by outputting the drive control signal Sd. That is, the motor control circuit 4 outputs the drive control signal Sd for driving the motor 20 to the motor driving unit 2 to perform rotation control of the motor 20. The motor driving unit 2 outputs a drive signal to the motor 20 based on the drive control signal Sd to drive the motor 20. Note that the motor control circuit 4 can perform braking control which turns on all three phases at a lower side or can perform free-run stop control which turns off all phases by generating and outputting the drive control signal Sd so that the motor 20 is put into a braking state or the free-run state as will be described later.

[Explanation of Motor Control Circuit 4]

Figure 2:
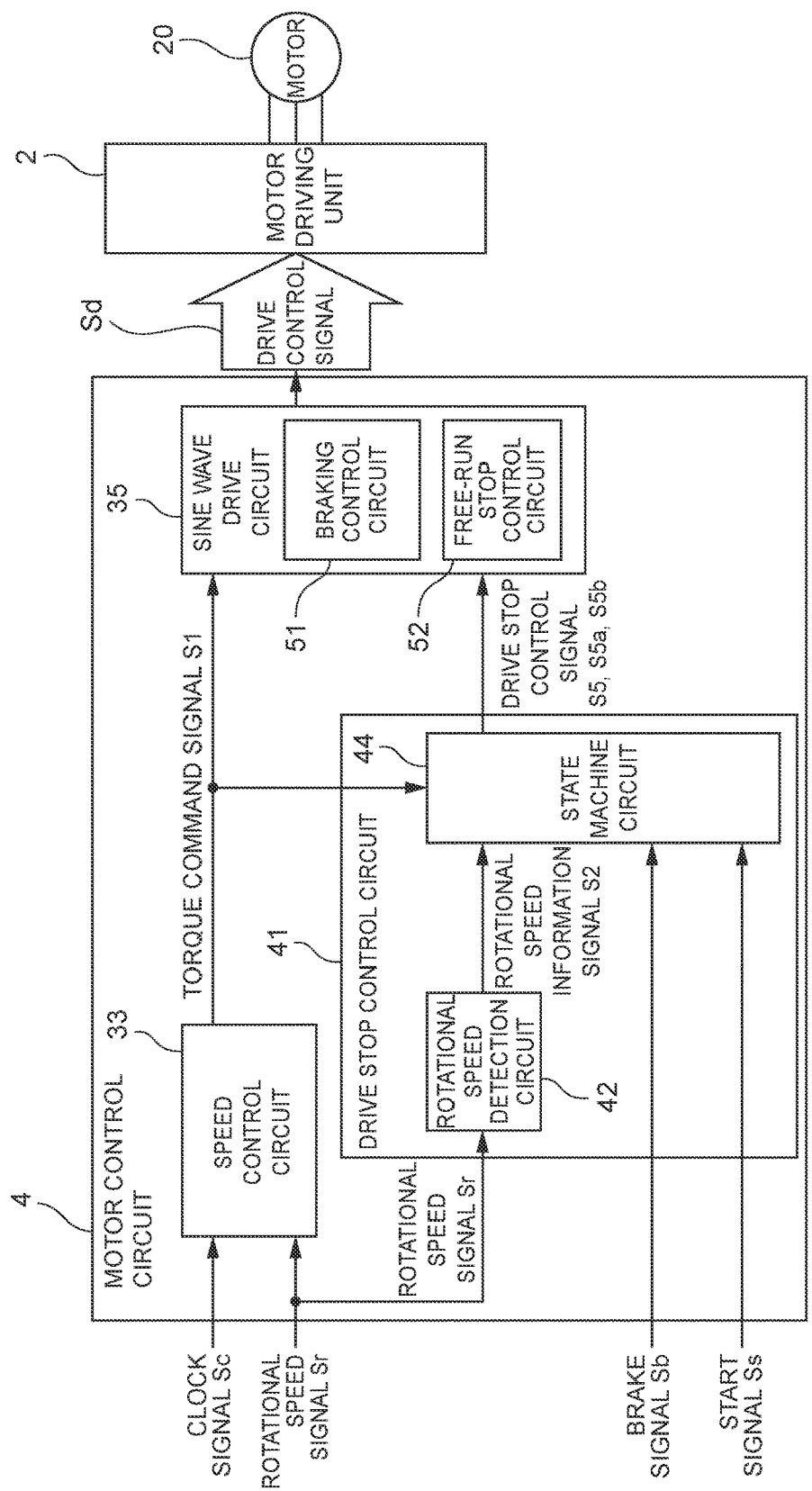
FIG. 2 is a block diagram illustrating configuration of a motor control circuit.

FIG. 2 is a block diagram illustrating configuration of the motor control circuit 4.

As illustrated in FIG. 2, the motor control circuit 4 includes a speed control circuit 33, a sine wave drive circuit (one example of the drive signal generation circuit) 35 and a drive stop control circuit 41. Each circuit is a digital circuit. Note that FIG. 2 illustrates transmission and reception of signals, information, or the like, between the circuits relating to explanation of generation of the drive control signal Sd.

The clock signal Sc and the rotational speed signal Sr are input to the speed control circuit 33. The speed control circuit 33 outputs a torque command signal (one example of the speed command information) S1 relating to the rotational speed of the motor 20 based on the clock signal Sc and the rotational speed signal Sr. The torque command signal S1 is input to the sine wave drive circuit 35 and the drive stop control circuit 41.

The sine wave drive circuit 35 outputs the drive control signal Sd according to the input torque command signal S1. Further, when a drive stop control signal S5 is input from the drive stop control circuit 41 as will be described later, the sine wave drive circuit 35 outputs the drive control signal Sd based on a control mode corresponding to the drive stop control signal S5 based on the drive stop control signal S5 and the torque command signal S1. By the drive control signal Sd being output from the sine wave drive circuit 35 in this manner, operation of the motor driving unit 2 is controlled.

The rotational speed signal Sr, the torque command signal S1 output from the speed control circuit 33, the brake signal Sb and the start signal Ss are input to the drive stop control circuit 41. When input of the clock signal Sc to the motor control circuit 4 is stopped (including a case where the clock signal Sc is not input to the motor control circuit 4 and a case where the clock signal Sc input to the motor control circuit 4 becomes a signal corresponding to a drive stop state (the rotational speed is substantially zero) of the motor 20), the drive stop control circuit 41 outputs the drive stop control signal S5 (a first drive stop control signal S5a or a second drive stop control signal S5b) to the sine wave drive circuit 35 based on the rotational speed signal Sr and the torque command signal S1. Note that the case where the rotational speed of the motor 20 is substantially zero includes a state where the rotational speed is zero in which the motor 20 completely stops, and a state where the rotational speed is equal to or less than a predetermined rotational speed (for example, several rpm) in which it can be judged that the motor 20 stops, and this state is referred to as a drive stop state of the motor 20. Further, the drive stop control circuit 41 outputs the drive stop control signal S5 to the sine wave drive circuit 35 based on the brake signal Sb or the start signal Ss.

The drive stop control circuit 41 includes a rotational speed detection circuit 42 and a state machine circuit 44.

The rotational speed signal Sr is input to the rotational speed detection circuit 42. The rotational speed detection circuit 42 outputs a rotational speed information signal S2 to the state machine circuit 44 based on the input rotational speed signal Sr. The rotational speed information signal S2 is a signal representing a rotation state (rotation equal to or greater than a threshold/rotation equal to or less than a threshold/substantially zero) of the motor 20.

The rotational speed information signal S2, the torque command signal S1, the brake signal Sb and the start signal Ss are input to the state machine circuit 44. The state machine circuit 44 outputs a signal as defined in advance based on the states of these input signals. In the present embodiment, the state machine circuit 44 is configured to output the drive stop control signal S5 based on a first threshold and a second threshold relating to the rotational speed of the motor 20 and a third threshold relating to the torque command signal S1, set in advance. The state machine circuit 44 outputs the drive stop control signal S5 according to conditions defined in advance based on the rotational speed information signal S2.

Note that each threshold may be set in advance and stored in a memory, or the like, which is not illustrated. The state machine circuit 44 may perform operation using the thresholds stored in the memory, or the like.

The state machine circuit 44 can output the first drive stop control signal S5a and the second drive stop control signal S5b as the drive stop control signal S5. The first drive stop control signal S5a is a signal for performing braking control of the motor 20. The second drive stop control signal S5b is a signal for performing free-run stop control of the motor 20.

The sine wave drive circuit 35 includes a braking control circuit S1 for performing braking control, and a free-run stop control circuit 52 for performing free-run stop control. When the first drive stop control signal S5a is input to the sine wave drive circuit 35, the sine wave drive circuit 35 outputs the drive control signal Sd to the motor driving unit 2 so that braking is performed using the braking control circuit 51. Further, when the second drive stop control signal S5b is input to the sine wave drive circuit 35, the sine wave drive circuit 35 outputs the drive control signal Sd to the motor driving unit 2 so that free-run stop control is performed using the free-run stop control circuit 52. In this manner, by the drive stop control circuit 41 outputting the drive stop control signal S5, the motor control circuit 4 can perform drive stop control of the motor 20 in an aspect according to the signal.

FIG. 3 is a diagram explaining a relationship between an aspect of control operation of the motor 20 and each signal according to the present embodiment.

FIG. 3 illustrates possible values and states of each signal in respective aspects of control operation in table form. A hyphen indicates that each signal can take an arbitrary value or state.

As illustrated in FIG. 3, upon normal drive, the drive control signal Sd for driving the motor 20 is output. At this time, both the brake signal Sb and the start signal Ss are "0". The clock signal Sc is input ("Yes"), the rotational speed signal Sr is input according to rotation of the motor 20, and the rotational speed information signal S2 is also output according to the rotational speed signal Sr. The torque command signal S1 is output according to the clock signal Sc and the rotational speed signal Sr ("Yes"). Neither the first drive stop control signal S5a nor the second drive stop control signal S5b is output ("No").

A method for stopping the motor 20 typically includes the following aspects. Also in the present embodiment, the motor control circuit 4 can utilize these stop methods.

One of the stop methods is braking. When the brake signal Sb becomes "1", and the start signal Ss becomes "0", the drive control signal Sd for performing braking of the motor 20 is generated and output (control operation: braking). This is performed by the first drive stop control signal S5a being output ("Yes"). In the case where the clock signal Sc is "Yes", regardless of conditions of the rotational speed signal Sr ("arbitrary (rotating/equal to or less than threshold/substantially zero)"), by the brake signal Sb becoming "1", braking is performed. In braking, the lower three phases of the motor 20 are turned on. By this means, a coil current for rotating the rotor flows through ground potential, and the motor 20 suddenly stops. Note that there is a case where braking for suddenly stopping the motor 20 is not actually used as a method for controlling the motor 20 used in an electric fan, or the like. That is, in an application of an electric fan, or the like, if the motor 20 suddenly stops, there is a possibility that an event which causes a sense of discomfort to a user, such as vibration and backlash may occur.

One of the stop method is free-run stop. When the start signal Ss becomes "1", and the brake signal Sb becomes "0", the drive control signal Sd for performing free-run stop of the motor 20 is generated and output (control operation: free-run stop). This is performed by the second drive stop control signal S5b being output ("Yes"). In free-run stop, all phases of the motor 20 are turned off. By all phases being turned off, the motor 20 naturally stops while inertially rotating. Note that when a command for performing free-run stop in this manner (start signal Ss: "1") is input, in the case where the clock signal Sc is "Yes", regardless of conditions of the rotational speed signal Sr ("arbitrary (rotating/equal to or less than threshold/substantially zero)"), free-run stop control is forcibly performed.

Further, as the stop method, there is so-called slow stop. In the present embodiment, slow stop is performed when the rotational speed of the motor 20 is equal to or greater than a predetermined first threshold. In the present embodiment, when the clock signal Sc becomes "No" (corresponding to the rotational speed of zero), to stop the motor 20, the motor control circuit 4 performs control so that the rotational speed of the motor 20 is gradually reduced through slow stop by the speed control circuit 33 making the torque command signal S1 gradually approach zero instead of making the torque command signal S1 zero immediately. The slow stop is typically often used as a function unique to a product using a fan such as an electric fan. By the rotational speed of the motor 20 being gradually reduced, it is possible to prevent occurrence of backlash or vibration of a product due to rapid change of speed and it is possible to gently stop the fan. Note that there are various aspects of slow stop. It is also possible to decelerate the motor 20 in a similar manner to slow stop by gradually lowering the torque command signal S1 by gradually lowering the clock signal Sc.

Here, in the present embodiment, the motor control circuit 4 performs drive stop control for stopping the motor 20 while switching control operation of slow stop (control operation (1): deceleration control (start)), braking (control operation (2): deceleration control (execution) braking (start)), and free-run stop (control operation (3): braking free-run stop (start)) in a state where input of the clock signal Sc is stopped. The control operation is switched according to the rotational speed of the motor 20.

In the control operation (1) in a deceleration mode (slow stop mode), input of the clock signal Sc is stopped and "No", the torque command signal S1 is output from the speed control circuit 33, and control for decelerating the motor 20 through slow stop is performed. When slow stop is started, the torque command signal S1 gradually approaches zero while the torque command signal S1 remains "Yes".

When the torque command signal S1 becomes equal to or less than a predetermined third threshold, and the rotational speed of the motor 20 becomes equal to or less than the first threshold (at this time, the rotational speed signal Sr becomes equal to or less than a threshold corresponding to the first threshold, and the rotational speed information signal S2 becomes equal to or less than the first threshold) while the clock signal Sc remains "No", the control operation (2) which is the braking mode is performed. In the control operation (2), the motor control circuit 4 outputs the drive control signal Sd so that braking is performed. That is, the control operation is switched from slow stop to braking. At the drive stop control circuit 41, it is detected at the state machine circuit 44 that the rotational speed of the motor 20 is equal to or less than the first threshold based on the rotational speed information signal S2 and the first threshold. In response to this result, the control operation is switched by the first drive stop control signal S5a being output from the state machine circuit 44.

When the torque command signal S1 becomes equal to or less than the third threshold and the rotational speed of the motor 20 becomes substantially zero (for example, when an interval of the FG signals becomes equal to or greater than a predetermined period) while the clock signal Sc remains "No", it is detected that the motor 20 is put into a drive stop state, and the control operation (3) which is a free-run stop mode is performed. In the control operation (3), the motor control circuit 4 outputs the drive control signal Sd so that free-run stop is performed. That is, the control operation is switched from braking to free-run stop. In the drive stop control circuit 41, it is detected at the state machine circuit 44 that the rotational speed of the motor 20 is substantially zero based on the rotational speed information signal S2. In response to this result, by the second drive stop control signal S5b being output from the state machine circuit 44, the control operation is switched.

Figure 4:
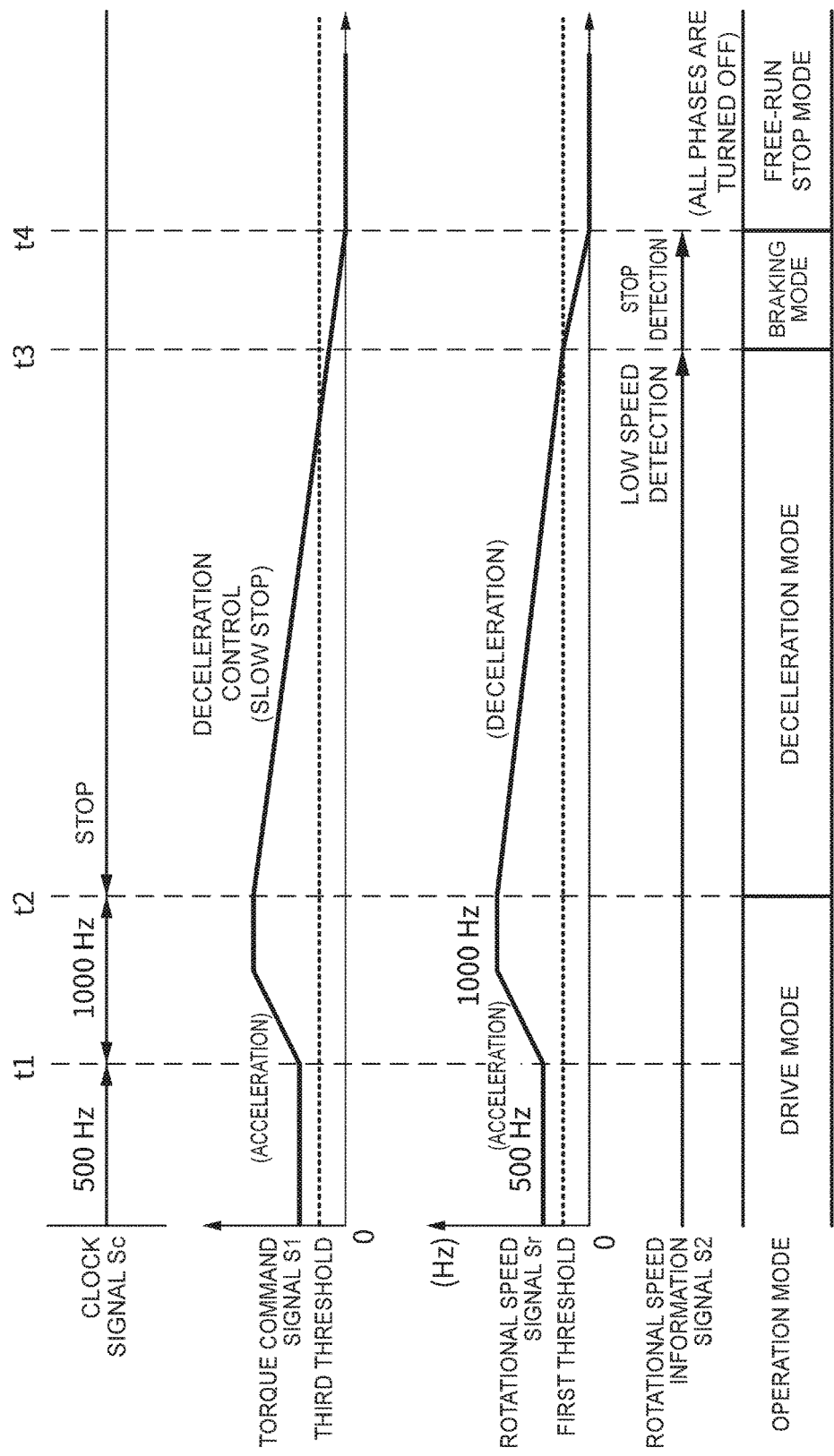
FIG. 4 is a timing chart illustrating an example of operation of the motor drive control apparatus when drive stop control of the present embodiment is performed.

FIG. 4 is a timing chart illustrating an example of operation of the motor drive control apparatus 1 when drive stop control of the present embodiment is performed.

FIG. 4 illustrates operation in the case where the motor 20 being driven is stopped. From an upper side of FIG. 4, the clock signal Sc, the torque command signal S1 and the third threshold, the rotational speed signal Sr and the first threshold, the rotational speed information signal S2, and the operation mode are illustrated in this order.

First, it is assumed that, as an initial state of FIG. 4, control is performed so that the motor 20 is rotated at 500 Hz in a drive mode. The clock signal Sc is 500 Hz, the torque command signal S1 is substantially constant, and the rotational speed signal Sr is substantially 500 Hz. Then, for example, when the clock signal Sc is changed to 1000 Hz at time t1, control is performed to make the torque command signal S1 higher, and the rotational speed signal Sr rises and becomes 1000 Hz.

Here, when the clock signal Sc is stopped (for example, becomes 0 Hz) at time t2, the operation mode is switched to a deceleration mode. As described above in the control operation (1), deceleration control through slow stop is started, and the torque command signal S1 is made gradually lower. In accordance with this, the rotational speed signal Sr also becomes gradually smaller.

When the rotational speed of the motor 20 becomes equal to or less than the first threshold at time t3 which is after time t2, it is detected at the state machine circuit 44 that the rotational speed becomes equal to or less than the first threshold based on the rotational speed information signal S2 (low speed detection). Further, at a time point of time t3, the torque command signal S1 is equal to or less than the third threshold. Therefore, at time t3, the operation mode is switched to a braking mode, and braking control is started (control operation (2)). By this means, the rotational speed of the motor 20 comparatively rapidly decreases toward zero from the first threshold.

When the rotational speed of the motor 20 becomes substantially zero at time t4 which is after time t3, it is detected at the state machine circuit 44 that the rotational speed becomes substantially zero based on the rotational speed information signal S2 (stop detection). At this time, the torque command signal S1 is substantially zero and equal to or less than the third threshold. Therefore, at time t4, the operation mode is switched to a free-run stop mode, and free-run stop control is started (control operation (3)). All phases of the drive voltage of the motor 20 are turned off, and the motor 20 is put into a stop state. Note that a case where the torque command signal S1 is substantially zero includes a case where a torque value is equal to or less than a predetermined value corresponding to the rotational speed equal to or less than a predetermined rotational speed, in which it can be judged that the motor 20 stops in addition to a case where the torque command signal S1 is zero.

Note that the value of the rotational speed which becomes the first threshold can be set at, for example, approximately 10 rpm, the value is not limited to this and can be appropriately set according to application, or the like, of the motor 20 or characteristics, or the like, of the motor 20. That is, it is only necessary to set as the first threshold, a value of the rotational speed which does not cause backlash or vibration at equipment using the motor 20 even if the motor 20 in a state where the motor 20 is rotating at the rotational speed is made to rapidly decelerate through braking. Such a value can be defined by actually performing experiments or using a simulation technique, or the like.

Further, it is only necessary to set a small value which maintains a state where the motor 20 is energized, as a predetermined value which becomes the third threshold for the torque command signal S1. When the torque command signal S1 is not zero (input), the motor 20 is put into an energization state where a coil current flows by a drive signal for driving the motor 20 being output and on/off operation of the switch elements being performed. When the torque command signal S1 is zero (not input), the motor 20 is put into a non-energization state where all phases of the switch elements for driving the motor 20 are turned off. If braking is started in the case where the state transitions from the energization state to the stop state, because lower side switch elements Q2, Q4 and Q6 of each phase are turned on, which brings about a state where there is a path through which a coil current flows, it is possible to avoid occurrence of regeneration. In the present embodiment, by braking being started in a state where the torque command signal S1 becomes equal to or less than the third threshold and is not zero, it is possible to avoid occurrence of regeneration and thereby prevent occurrence of an abnormal state in accordance with regeneration.

While operation in the case where the motor 20 is stopped from a state where the motor 20 is driven has been described above, in the present embodiment, the motor control circuit 4 is configured to switch the control operation according to the rotational speed of the motor 20 even in a state where the motor 20 is stopped.

That is, returning to FIG. 3, in the case where the motor 20 is put into a free-run stop state, the control operation (4) which is the braking mode is performed in a predetermined case. That is, when the torque command signal S1 is "No" (when the motor 20 is put into a state where the motor 20 would normally stop), if the rotational speed of the motor 20 becomes equal to or greater than the second threshold (at this time, the rotational speed signal Sr becomes equal to or greater than a threshold corresponding to the second threshold, and the rotational speed information signal S2 becomes equal to or greater than the second threshold), the control operation (4) is performed. In the control operation (4), the first drive stop control signal S5a is output from the drive stop control circuit 41, and the motor control circuit 4 outputs the drive control signal Sd so that braking is performed. That is, the control operation is switched from free-run stop to braking.

Further, for example, in a state where the control operation (4) is performed and braking is executed, in a predetermined case, the control operation (5) which is the free-run stop mode is performed. That is, when the torque command signal S1 is "No", if the rotational speed of the motor 20 becomes substantially zero, the control operation (5) is performed. In the control operation (5), the second drive stop control signal S5b is output from the drive stop control circuit 41, and the motor control circuit 4 outputs the drive control signal Sd so that free-run stop is performed. That is, the control operation is switched from braking to free-run stop.

Note that when such control operation (4) and control operation (5) are performed, the clock signal Sc may be "Yes" or "No". Further, the start signal Ss may be "0" or "1". The control operation (4) and the control operation (5) are performed in the case where the motor 20 rotates by an external force in a state where the above-described control operation (1) to control operation (3) are performed. At this time, the clock signal Sc is "No", and the start signal Ss is "0". Further, the control operation (4) and the control operation (5) are also performed in the case where the motor 20 rotates by an external force after the motor 20 stops by free-run stop control being performed as a result of the start signal Ss becoming "1". At this time, the clock signal Sc is "Yes", and the start signal Ss is "1".

Figure 5:
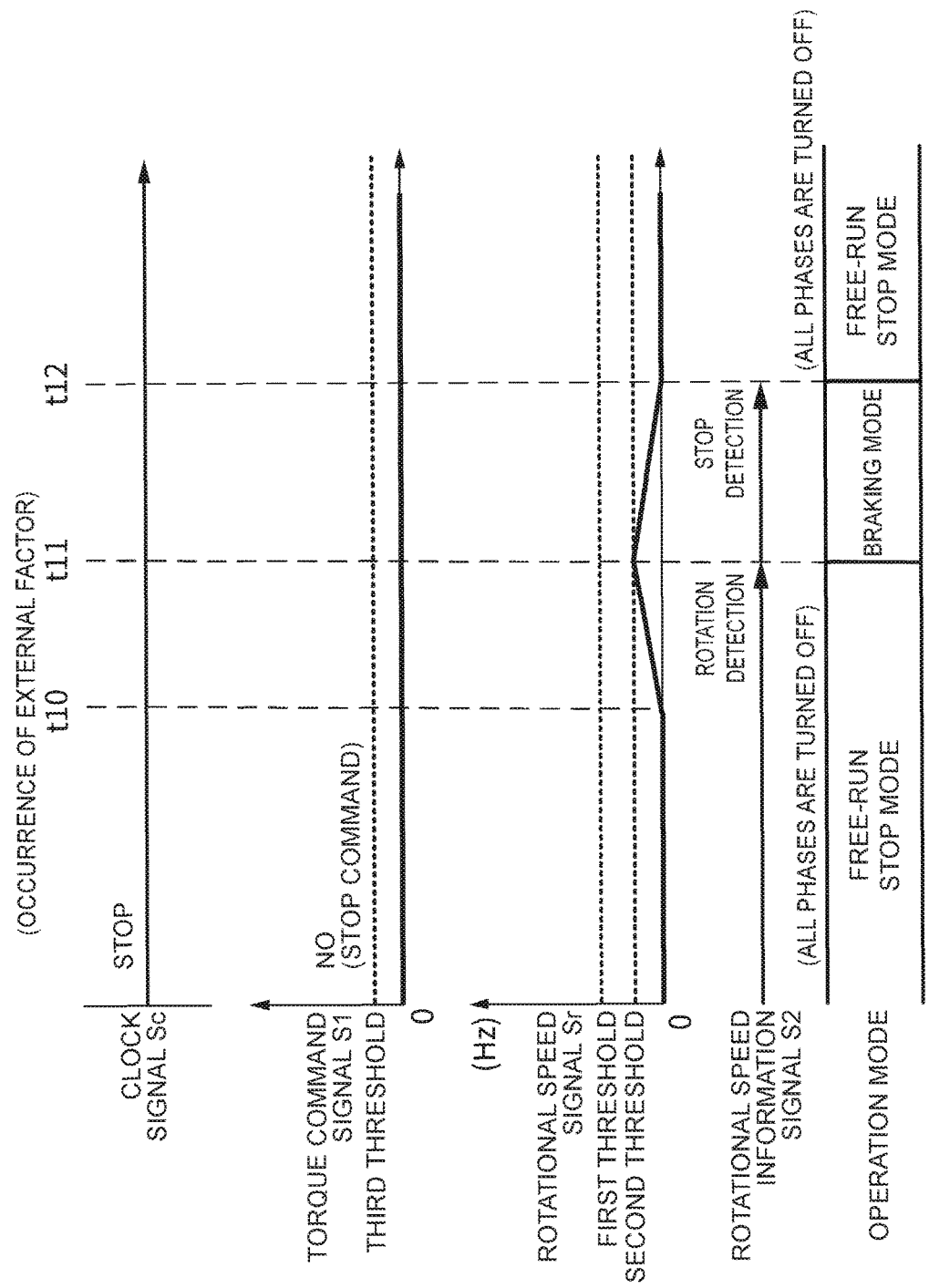
FIG. 5 is a timing chart illustrating an example of operation of the motor drive control apparatus when drive stop control is performed in a state where the motor is stopped in the present embodiment.

FIG. 5 is a timing chart illustrating an example of operation of the motor drive control apparatus 1 when drive stop control is performed in a state where the motor 20 stops in the present embodiment.

FIG. 5 illustrates an example of transition of each signal in the case where the motor 20 stops. From an upper part of FIG. 5, as with FIG. 4, the clock signal Sc, the torque command signal S1 and the third threshold, the rotational speed signal Sr and the thresholds (the first threshold, the second threshold), the rotational speed information signal S2, and the operation mode are illustrated in this order.

First, as an initial state of FIG. 5, a case is assumed where the operation mode is a free-run stop mode, and the motor 20 stops. The clock signal Sc is a value (for example, 0 Hz) corresponding to a stop state, the torque command signal S1 is substantially zero ("No"), and the rotational speed signal Sr is substantially 0 Hz.

Here, a case is assumed where the motor 20 starts rotating by an external force being applied by an external factor at time t10. When the motor 20 rotates, the rotational speed signal Sr rises. At this time, the clock signal Sc remains a stop state, and the torque command signal S1 also remains substantially zero.

When the rotational speed of the motor 20 becomes equal to or greater than the second threshold at time t11 after time t10, it is detected at the state machine circuit 44 that the rotational speed has become equal to or greater than the second threshold based on the rotational speed information signal S2 (rotation detection). Further, at a time point of time t11, the torque command signal S1 remains "No". Therefore, at time t11, the operation mode is switched to a braking mode, and braking control is started (control operation (4)). By this means, the rotational speed of the motor 20 decreases toward zero from the second threshold.

When the rotational speed of the motor 20 becomes substantially zero at time t12 after time t11, it is detected at the state machine circuit 44 that the rotational speed becomes substantially zero based on the rotational speed information signal S2 (stop detection). Further, at a time point of time t12, the torque command signal S1 remains "No". Therefore, at time t12, the operation mode is switched to a free-run stop mode, and free-run stop control is started (control operation (5)). By this means, the rotational speed of the motor 20 becomes substantially zero and is maintained at substantially zero.

Note that the second threshold only has to be the same value as the first threshold or smaller than the first threshold. If braking is performed when the rotational speed is smaller than the first threshold, backlash or vibration do not occur at equipment in which the motor 20 is mounted.

Drive stop control performed in the present embodiment can be explained as follows using a flowchart.

Figure 6:
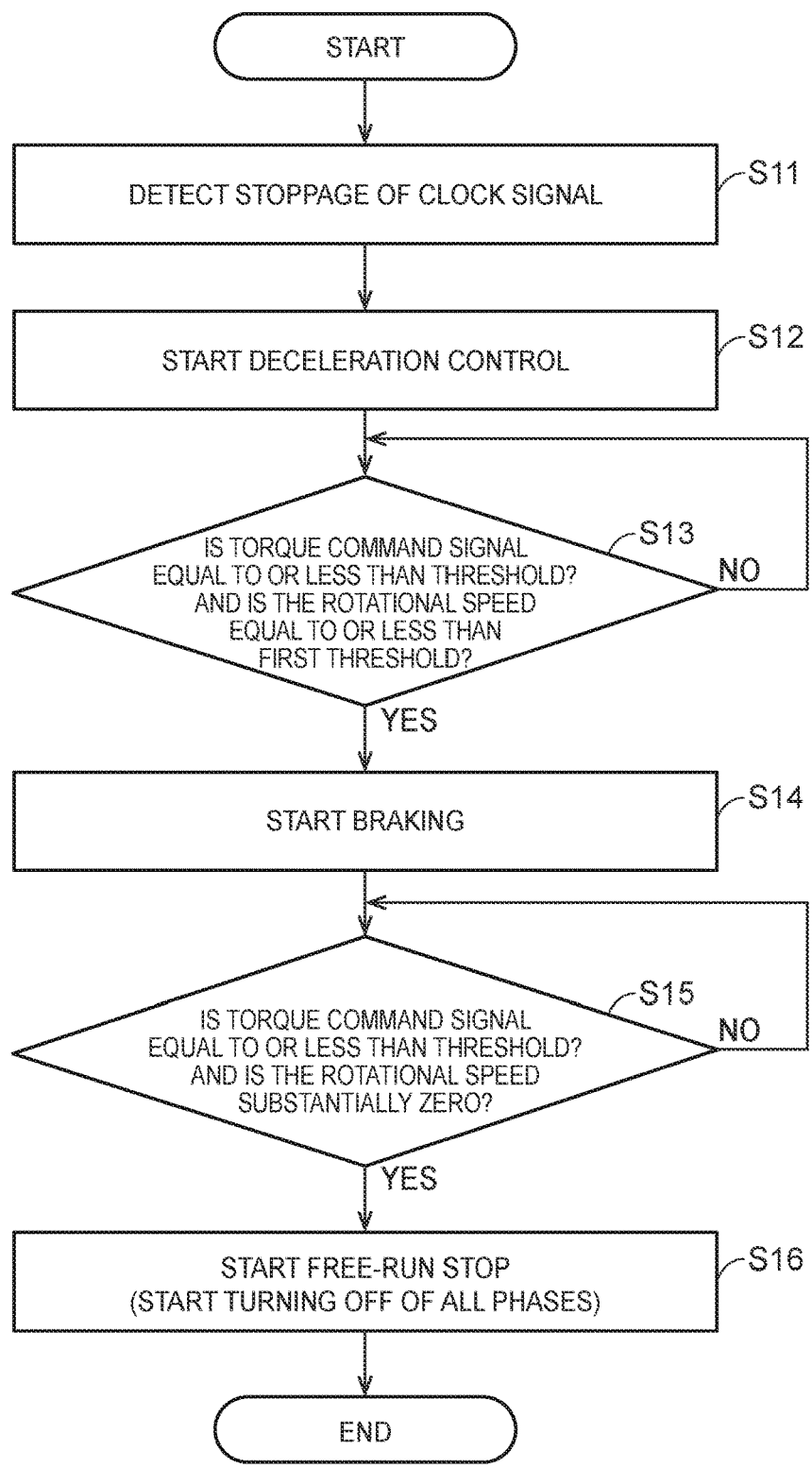
FIG. 6 is a flowchart illustrating operation of the motor drive control apparatus 1 when the motor in a drive state is stopped in the present embodiment.

FIG. 6 is a flowchart illustrating operation of the motor drive control apparatus 1 when the motor 20 in a drive state is stopped in the present embodiment.

As illustrated in FIG. 6, in step S11, when the motor 20 is driven, if the clock signal Sc is stopped, the motor control circuit 4 detects that the clock signal Sc is stopped.

In step S12, the motor control circuit 4 starts deceleration control. The above-described control operation (1) is performed.

In step S13, the motor control circuit 4 detects that the torque command signal S1 is equal to or less than the third threshold, and the rotational speed of the motor 20 is equal to or less than a predetermined first threshold. That is, the motor control circuit 4 judges whether or not the torque command signal S1 is equal to or less than the third threshold, and the rotational speed of the motor 20 is equal to or less than the first threshold.

In step S13, when it is detected that the torque command signal S1 is equal to or less than a predetermined value, and the rotational speed of the motor 20 is equal to or less than the predetermined first threshold (in the case of "Yes"), in step S14, the motor control circuit 4 outputs the drive control signal Sd for performing braking control. By this means, braking is started (the above-described control operation (2)). Note that, in step S13, in the case where the torque command signal S1 exceeds the predetermined value or the rotational speed of the motor 20 exceeds the first threshold (in the case of "No"), step S13 is repeated.

In step S15, the motor control circuit 4 detects that the torque command signal S1 is equal to or less than the third threshold, and the rotational speed of the motor 20 is substantially zero. That is, the motor control circuit 4 judges whether or not the torque command signal S1 is equal to or less than the third threshold, and the rotational speed of the motor 20 is substantially zero.

In step S15, when it is detected that the torque command signal S1 is equal to or less than the third threshold, and the rotational speed of the motor 20 is substantially zero, in step S16, the motor control circuit 4 outputs the drive control signal Sd for performing free-run stop control. By this means, all phases are turned off, and the state becomes a free-run stop state (the above-described control operation (3)). Note that, in step S15, in the case where the torque command signal S1 exceeds the third threshold or the rotational speed of the motor 20 is not substantially zero (in the case of "No"), step S15 is repeated.

Figure 7:
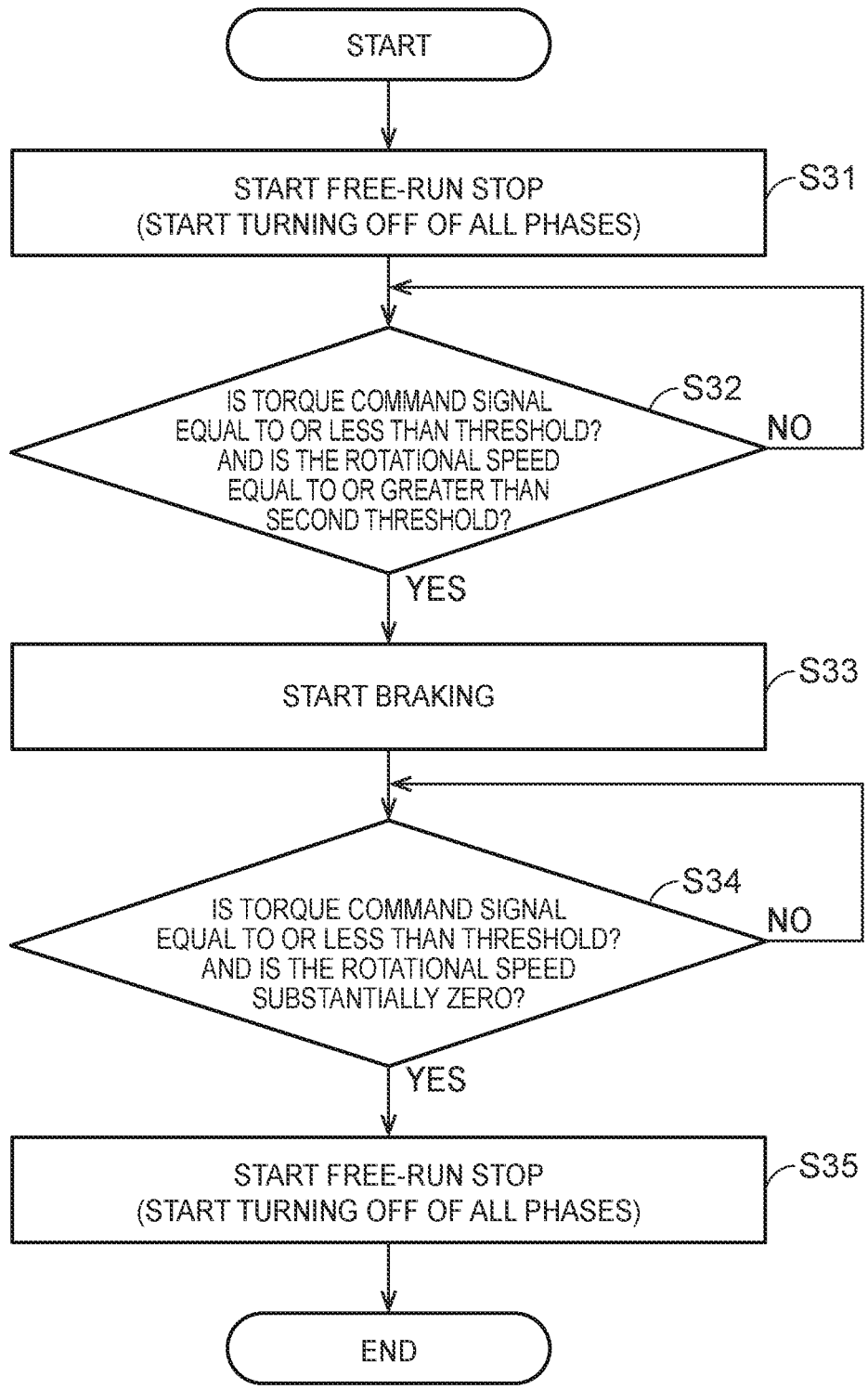
FIG. 7 is a flowchart illustrating operation of the motor drive control apparatus when the motor is put into a stop state.

FIG. 7 is a flowchart illustrating operation of the motor drive control apparatus 1 when the motor 20 is put into a stop state.

As illustrated in FIG. 7, it is assumed that, in step S31, the motor 20 stops by being controlled by the motor drive control apparatus 1 through free-run stop (the above-described control operation (3) or a case where the start signal Ss becomes "1" and free-run stop control is performed).

In step S32, the motor control circuit 4 detects that the torque command signal S1 is equal to or less than the third threshold, and the rotational speed of the motor 20 is equal to or greater than a predetermined second threshold. That is, the motor control circuit 4 judges whether or not the torque command signal S1 is equal to or less than the third threshold, and the rotational speed of the motor 20 is equal to or greater than the second threshold.

When it is detected in step S32 that the torque command signal S1 is equal to or less than a predetermined value, and the rotational speed of the motor 20 is equal to or greater than the second threshold, in step S33, the motor control circuit 4 outputs the drive control signal Sd for performing braking control. By this means, braking is started (the above-described control operation (4)). Note that, in step S32, in the case where the torque command signal S1 exceeds the predetermined value, or the rotational speed of the motor 20 exceeds the second threshold (in the case of "No"), step S32 is repeated.

In step S34, the motor control circuit 4 detects that the torque command signal S1 is equal to or less than the third threshold, and the rotational speed of the motor 20 is substantially zero. That is, the motor control circuit 4 judges whether or not the torque command signal S1 is equal to or less than the third threshold, and the rotational speed of the motor 20 is substantially zero.

When it is detected in step S34 that the torque command signal S1 is equal to or less than the third threshold, and the rotational speed of the motor 20 is substantially zero, in step S35, the motor control circuit 4 outputs the drive control signal Sd for performing free-run stop control. By this means, all phases are turned off, and the state becomes a free-run stop state (the above-described control operation (5)). Note that, in step S34, in the case where the torque command signal S1 exceeds the third threshold, or the rotational speed of the motor 20 is not substantially zero (in the case of "No"), step S34 is repeated.

Effects of Embodiment

Conventionally, as described above, if a motor rotates due to an external factor and power is generated in a state where the motor stops by a free-run stop method, there is a case where an abnormal state occurs at a circuit part, or the like, of the motor drive control apparatus (first abnormal state).

Further, conventionally, there is a case where, in the case where the motor is driven, if an attempt is made to stop the motor using a free-run stop method, the state becomes a regenerating state, and an abnormal state occurs at a circuit part, or the like, of the motor drive control apparatus (second abnormal state). Further, in such a case, when the state becomes a regenerating state, there is a case where a raspy abnormal noise like clicking sound of "click" occurs at the motor drive control apparatus (third abnormal state).

On the other hand, in the present embodiment, when the torque command signal S1 becomes equal to or less than the third threshold, and the rotational speed of the motor 20 becomes equal to or greater than the second threshold during free-run stop (while rotation of the rotor is stopped), braking is started. By this means, it is possible to prevent occurrence of the above-described first abnormal state.

Specifically, because braking control is performed when the torque command signal S1 is zero and the rotational speed of the motor 20 becomes equal to or greater than the second threshold during free-run stop command, it is possible to avoid a power generation state. Therefore, for example, in the case where the motor 20 is used in application for rotating a fan, or the like, even if the rotor rotates by an external force such as blowing of strong wind to the fan, it is possible to prevent the power supply voltage of the motor drive control apparatus 1 from rising due to power generation or regeneration by the state quickly transitioning to braking. Accordingly, it is possible to prevent occurrence of an abnormal state such as breakage and abnormal operation of a circuit part at the motor drive control apparatus 1.

Further, in the present embodiment, it is configured such that, when the motor 20 is driven, after the clock signal Sc is stopped, the control operation is switched to the free-run stop mode after the control operation is switched from the deceleration control mode to the braking mode. The control operation is switched according to the torque command signal S1 and the rotational speed of the motor 20. As a result of control being performed in this manner, it is possible to prevent occurrence of the above-described second abnormal state and third abnormal state.

Specifically, because deceleration control through slow stop is performed instead of free-run stop in a region where the rotational speed of the motor 20 is high, it is possible to gradually reduce the rotational speed without causing regeneration. By operation being performed in the deceleration control mode, the state does not become a power generation state even if an external force, or the like is applied during deceleration, so that the power supply voltage of the motor drive control apparatus 1 does not rise. Therefore, it is possible to prevent occurrence of the second abnormal state and the third abnormal state.

Further, when the torque command signal S1 is equal to or less than a predetermined value and the rotational speed of the motor 20 becomes equal to or less than the first threshold during operation in the deceleration control mode, the mode is made to transition to the braking mode. Because it is possible to make the mode transition to braking through ultralow speed rotation (the value of the torque command signal S1 is extremely small), a current is not rapidly generated, so that it is possible to stop the motor 20 while preventing occurrence of vibration and occurrence of backlash due to braking. Further, also in the case where there is an external factor which causes the rotor to rotate, it is possible to make it difficult to rotate the rotor by braking being performed, so that it is possible to reliably stop the rotor.

Further, when the torque command signal S1 is equal to or less than the predetermined value, and the rotational speed of the motor 20 becomes substantially zero during operation in the braking mode, the mode is made to transition to the free-run stop mode. Therefore, it is possible to make the state a stable state where a voltage is not applied to the motor 20 and all phases are turned off, in a state where the motor 20 stops.

In the present embodiment, even if the brake signal Sb, or the like, is not input from outside, the state machine circuit 44 outputs the first drive stop control signal S5a for starting braking under predetermined conditions. The motor drive control apparatus 1 makes the mode transition to the free-run stop mode in a stage where the rotational speed of the motor 20 becomes substantially zero after the mode is made to autonomously transition from the deceleration control mode to the braking mode based on the clock signal Sc and the rotational speed signal Sr of the motor 20. Therefore, it becomes unnecessary to perform fine control on a signal to be input to the motor drive control apparatus 1 to prevent occurrence of an abnormal state when the free-run stop method is used, so that it is possible to easily use the motor drive control apparatus 1 in various applications.

[Others]

The circuit configuration of the motor control circuit is not limited to circuit configuration as illustrated in FIG. 2. Various types of circuit configuration which are configured to meet the purpose of the present disclosure can be applied.

The above-described FIG. 3 is merely one specific example. While, in FIG. 3, priority is set in an order such that the clock signal Sc<the brake signal Sb<the start signal Ss, the priority can be set appropriately according to specifications of the motor drive control apparatus.

At least part of the components of the motor drive control apparatus may implement processing using software instead of using hardware.

The above-described operation examples (such as the rotational speed) in the timing chart and the operation examples in the flowchart are specific examples, and operation is not limited to such operation examples. Other processing may be performed between processing in the flowchart.

The motor which is driven by the motor drive control apparatus of the present embodiment is not limited to a three-phase brushless motor. The number of Hall elements is not limited to three. A driving scheme of the motor is not limited to a sine wave driving scheme, and, for example, may be a rectangular wave driving scheme.

Part or all of processing in the above-described embodiment may be performed using software or may be performed using a hardware circuit.

It should be considered that the above-described embodiment is illustrative in all points and not limitative. The scope of the present disclosure is indicated not by the above description, but by the claims, and it is intended that all modifications within the meaning and the scope equivalent to the claims are incorporated.

What is claimed is:

1. A motor control circuit comprising:
   a speed control circuit configured to output speed command information relating to a rotational speed of a motor based on target information relating to a target rotational speed and rotational speed detection information of the rotational speed of the motor;
   a drive signal generation circuit configured to generate a drive control signal for driving the motor based on the speed command information; and
   a drive stop control circuit configured to output a first drive stop control signal for performing braking control of the motor or a second drive stop control signal for performing free-run stop control of the motor based on the rotational speed detection information and the speed command information when input of the target information is stopped,
   wherein the drive stop control circuit outputs the first drive stop control signal based on a detection result that the speed command information is equal to or less than a predetermined value, and the rotational speed of the motor is equal to or less than a predetermined first threshold, and
   outputs the second drive stop control signal based on a detection result that the speed command information is equal to or less than the predetermined value, and the motor is put into a drive stop state, and
   the drive signal generation circuit generates the drive control signal based on the first drive stop control signal or the second drive stop control signal when the first drive stop control signal or the second drive stop control signal is output at the drive stop control circuit.

2. The motor control circuit according to claim 1,
wherein, when input of the target information is stopped in a state where the motor is driven, the speed command information is output by the speed control circuit to perform control for decelerating the motor,
when the speed command information becomes equal to or less than the predetermined value, and the rotational speed of the motor becomes equal to or less than the first threshold after control for decelerating the motor is started, the first drive stop control signal is output by the drive stop control circuit to perform braking control of the motor, and
when the speed command information becomes equal to or less than the predetermined value, and the motor is put into a drive stop state after braking control of the motor is started, the second drive stop control signal is output by the drive stop control circuit to perform free-run stop control of the motor.

3. The motor control circuit according to claim 1,
wherein the drive stop control circuit outputs the first drive stop control signal based on a detection result that the speed command information is equal to or less than the predetermined value, and the rotational speed of the motor is equal to or greater than a predetermined second threshold in the case where free-run stop control of the motor is performed.

4. The motor control circuit according to claim 3,
wherein, when the rotational speed of the motor becomes equal to or greater than the second threshold while free-run stop control of the motor is performed, and, then, the speed command information becomes equal to or less than the predetermined value and the motor is put into a drive stop state in the case where braking control of the motor is started by the first drive stop control signal being output from the drive stop control circuit, the second drive stop control signal is output from the drive stop control circuit to perform free-run stop control of the motor.

5. The motor control circuit according to claim 1,
wherein the drive stop control circuit is further configured to output the first drive stop control signal when braking command information for performing braking control of the motor is input and output the second drive stop control signal when drive command information for performing free-run stop control is input, and
the drive stop control circuit outputs the first drive stop control signal or the second drive stop control signal based on the rotational speed detection information and the speed command information when input of the target information is stopped, and neither the braking command information nor the drive command information is input.

6. A motor drive control apparatus comprising:
the motor control circuit according to claim 1; and
a motor driving unit configured to output a drive signal to the motor to drive the motor based on the drive control signal output from the motor control circuit.

7. A control method of a motor drive control apparatus including
a motor control circuit configured to output a drive control signal for performing drive control of a motor based on target information relating to a target rotational speed and rotational speed detection information of a rotational speed of the motor, and
a motor driving unit configured to output a drive signal to the motor to drive the motor based on the drive control signal output from the motor control circuit, the control method comprising:
a speed control step of outputting speed command information relating to the rotational speed of the motor based on the target information and the rotational speed detection information;
a drive signal generation step of generating the drive control signal for driving the motor based on the speed command information; and
a drive stop control step of outputting a first drive stop control signal for performing braking control of the motor or a second drive stop control signal for performing free-run stop control of the motor based on the rotational speed detection information and the speed command information when input of the target information is stopped,
wherein, in the drive stop control step,
the first drive stop control signal is output based on a detection result that the speed command information is equal to or less than a predetermined value, and the rotational speed of the motor is equal to or less than a predetermined first threshold,
the second drive stop control signal is output based on a detection result that the speed command information is equal to or less than the predetermined value, and the motor is put into a drive stop state, and
in the drive signal generation step, when the first drive stop control signal or the second drive stop control signal is output in the drive stop control step, the drive control signal is generated based on the first drive stop control signal or the second drive stop control signal.

* * * * *